(12) United States Patent
Hasenfratz et al.

(10) Patent No.: US 10,350,534 B2
(45) Date of Patent: Jul. 16, 2019

(54) FILTER ELEMENT, IN PARTICULAR FOR GAS FILTRATION

(71) Applicant: MANN+HUMMEL GMBH, Ludwigsburg (DE)

(72) Inventors: Robert Hasenfratz, Schwaebisch-Hall (DE); Fabian Wagner, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 107 days.

(21) Appl. No.: 15/486,650

(22) Filed: Apr. 13, 2017

(65) Prior Publication Data

US 2017/0216749 A1 Aug. 3, 2017

Related U.S. Application Data

(63) Continuation of application No. PCT/EP2015/071281, filed on Sep. 17, 2015, and a continuation-in-part of application No. 15/130,872, filed on Apr. 15, 2016, which is a continuation of application No. PCT/EP2014/071895, filed on Oct. 13, 2014.

(30) Foreign Application Priority Data

Oct. 15, 2013 (DE) .................. 10 2013 017 034
Oct. 13, 2014 (DE) .................. 10 2014 014 978

(51) Int. Cl.
*B01D 46/00* (2006.01)
*F02M 35/024* (2006.01)
*B01D 46/52* (2006.01)
*B01D 46/12* (2006.01)
*F02M 35/04* (2006.01)
*F02M 35/02* (2006.01)

(52) U.S. Cl.
CPC ......... *B01D 46/521* (2013.01); *B01D 46/002* (2013.01); *B01D 46/12* (2013.01); *F02M 35/0215* (2013.01); *F02M 35/02416* (2013.01); *F02M 35/02491* (2013.01); *F02M 35/04* (2013.01); *B01D 2265/02* (2013.01); *B01D 2265/025* (2013.01)

(58) Field of Classification Search
CPC .. B01D 46/0005; B01D 46/002; B01D 46/12; B01D 46/521; B01D 2265/02; B01D 2265/025; F02M 35/0215; F02M 35/02416
See application file for complete search history.

(56) References Cited

U.S. PATENT DOCUMENTS

2012/0159910 A1 6/2012 Mills
2012/0174788 A1 7/2012 Felber

FOREIGN PATENT DOCUMENTS

DE 102011083657 A1 3/2013
DE 102013206090 A1 10/2014

*Primary Examiner* — Robert Clemente
(74) *Attorney, Agent, or Firm* — James Hasselbeck

(57) ABSTRACT

A filter element has, on a filter element housing, a first and a second filter medium body, which are arranged at an angle to each other.

12 Claims, 4 Drawing Sheets

FILTER ELEMENT, IN PARTICULAR FOR GAS FILTRATION

CROSS-REFERENCE TO RELATED APPLICATIONS

This application is a continuation application of international application No. PCT/EP2015/071281 having an international filing date of 17 Sep. 2015 and designating the United States, the international application claiming a priority date of 13 Oct. 2014, based on prior filed German patent application No. 10 2014 014 978.1, the entire contents of the aforesaid international application and the aforesaid German patent application being incorporated herein by reference.

This application is a continuation-in-part application of U.S. patent application Ser. No. 15/130,872 filed 15 Apr. 2016 which is a continuation application of international application No. PCT/EP2014/071895 filed 13 Oct. 2014, the international application claiming a priority date of 15 Oct. 2013, based on prior filed German patent application No. 10 2013 017 034.6, the entire contents of the aforesaid international application and the aforesaid US application being incorporated herein by reference.

TECHNICAL FIELD

The invention relates to a filter element, in particular for gas filtration, according to the preamble of claim 1.

BACKGROUND

DE 10 2011 083 657 A1 describes a filter element that is used for a fresh air system of a motor vehicle and has two separately embodied filter medium bodies designed as pleated filters. The filter element comprises a support body having two end plates that may be connected to one another via two parallel strips. An outflow opening for the filtered fluid is added to one of the end plates. The two filter medium bodies are inserted opposing and at a distance to one another between the end plates and the connecting strips such that an interposing clean chamber is formed, from which chamber the filtered fluid may be discharged via the outflow opening in the one end plate. The two filter medium bodies are embodied in the shape of rectangular blocks and are arranged laterally reversed to one another in the filter element.

SUMMARY

The underlying object of the invention is to create a compactly embodied filter element having high filtration performance.

The inventive filter element is preferably used for gas filtration, in particular for filtration of combustion air for an internal combustion engine or for purifying fresh air that is supplied to compartments such as, for instance, the interiors of passenger vehicles. However, it is also possible to use the invention for filtering fluids.

The filter element comprises a filter element housing, which forms a support body, and at least a first and a second filter medium body at which the filtration of the fluid takes place. The first and the second filter medium bodies are inserted into the filter element housing of the filter element and delimit a common clean chamber in which the filtered fluid is collected on the outflow side of the two filter medium bodies and is then discharged via an outflow opening. Receiving pockets in which the filter medium bodies are inserted may be added to the filter element housing.

The outflow sides of the first and of the second filter medium bodies are disposed at an angle to one another and thus assume a non-parallel position relative to one another. The angular arrangement improves the adaptation of the filter element to different installation characteristics, while also providing a more compact design of the filter element. For instance, it is possible to use installation spaces that extend around a corner for installing the filter element embodied at an angle so that even such installation spaces may be used efficiently for the filtering fluids.

Alternatively or in addition to the angular relative arrangement of the outflow side of the filter medium bodies, it is also possible to orient the inflow sides of the filter medium bodies at an angle to one another. In one preferred embodiment, the two filter medium bodies each have at least an approximately rectangular block shape so that the inflow and outflow sides are disposed parallel to one another within each filter medium body and, in an angular relative arrangement, both the inflow sides and the outflow sides of the filter medium assume an angular position relative to one another.

The two filter medium bodies are either constructed identically and received preferably laterally reversed to one another in the filter element housing of the filter element, or, according to an alternative embodiment, are constructed non-symmetrically in that, for instance, one filter medium body has a step or chamfered edge.

The filter medium bodies are arranged in the filter element such that the center planes disposed perpendicular to the outflow sides and/or the inflow sides are arranged at an angle to one another through the first and/or second filter medium body. The center plane sectional axis may possibly coincide with the longitudinal axis of the filter element, which longitudinal axis runs parallel to an outflow side of a filter medium body, for example. The center plane sectional axis may also be non-identical to the longitudinal axis of the filter element, however.

The center planes together form an angle that is for instance less than 180° and a maximum of 90°. Advantageously, in this embodiment the filter element with the filter element housing has an angular shape, wherein the angle of the filter element housing corresponds to the angle that the center planes form with one another.

According to another useful embodiment, the outflow side and/or the inflow side of the first and/or second filter medium body is arranged at an angle to the center plane sectional axis, possibly the longitudinal axis of the filter element. For instance, the outflow side of the first filter medium body may run parallel and the outflow side of the second filter medium body may run at an angle, and therefore non-parallel, to the center plane sectional axis or longitudinal axis of the filter element. It is also possible for the outflow sides of the first and of the second filter medium body to form different angles with the center plane sectional axis or longitudinal axis of the filter element. The angle relative to the center plane sectional axis or the longitudinal axis of the filter element is preferably greater than 0° and is a maximum of 60°.

The center planes through the filter medium bodies may be arranged parallel or coplanar with one another, wherein, in the case of a coplanar embodiment, the center planes intersect the longitudinal axis of the filter element, and, given a parallel arrangement, the filter medium bodies are arranged offset to one another. However, it is also possible to provide, in addition to the angular arrangement of the inflow or outflow side of a filter medium body, an angular arrangement of the center plane of at least one filter medium body, so that one or both filter medium bodies are inclined at an angle in two different planes.

The filter medium bodies are embodied as pleated filters, for instance; however, other embodiments of the filter medium bodies made of a compact filter material are also possible.

If the filter medium bodies are embodied as pleated filters, at least one pleat pocket of the first filter medium body has an orientation that is different from at least one pleat pocket of the second filter medium body. In particular, the pleats of the first filter medium body have a consistent first orientation and the pleats of the second filter medium body have a consistent second orientation, the first and second orientations differing, however. The orientation of a pleat pocket corresponds in particular to its depth direction, i.e., the direction in which the pleat base transitions to the pleat opening.

According to another advantageous embodiment, the outflow opening extends at least approximately coaxial with or at least approximately parallel to the longitudinal axis of the filter element. In this case, the axis runs through the outflow opening coaxial with or parallel to or approximately coaxial with or parallel to the longitudinal axis of the filter element. The outflow opening in this case is preferably disposed in a lateral or end part of the filter element housing that houses the clean chamber.

Also possible is an embodiment in which the axis of the outflow opening is arranged at least approximately perpendicular to the longitudinal axis of the filter element. In this case, the outflow opening is disposed in a bottom or cover part of the filter element housing.

An outflow tube that is embodied either integrally with the filter element housing or as a separate component and is joined to the filter element housing may connect to the outflow opening.

According to another useful embodiment, the filter element housing may be embodied curved or bent in the region of the clean chamber. The curvature follows in particular the angular arrangement of the filter medium bodies on diagonally opposing sides of the filter element housing. Both a curved embodiment of the filter element housing in the region of the clean chamber and an angular design of the filter element housing are possible.

A trapezoidal embodiment of the filter element housing in the region of the clean chamber is also possible if the inflow and/or outflow sides of the two filter medium bodies are oriented at an angle to the longitudinal axis of the filter element and at the same time the center planes through the filter medium bodies are arranged coplanar.

According to another advantageous embodiment, receiving pockets are embodied on the filter element housing that receive the first and the second filter medium body. The inner contour of the receiving pockets may be adapted to the outer contour of the respective filter medium body received. This attains a positive, secure seating of the filter medium bodies in the receiving pockets. Filter medium bodies may easily be inserted into the receiving pockets, which are open to the outside, and which are in flow connection with the clean chamber, in particular are immediately adjacent to the clean chamber in the filter element housing. Advantageously, for a flow-tight connection of the filter medium bodies to the filter element housing, a circumferential sealing edge is formed in each receiving pocket and is in contact with the respective filter medium body. The sealing mass of the sealing edge may simultaneously glue the filter medium body in the receiving pocket.

The filter medium bodies may have the same geometry and be embodied the same size or may be different in size and/or have different geometries.

The filter element housing is usefully embodied as a plastic injection-molded component. It is possible to embody the filter element housing as a one-piece plastic injection-molded component or for it to be made of a plurality of separate components that are each embodied as plastic injection-molded parts.

The filter element with the at least two filter medium bodies forms a filter insert part that may be inserted into a filter housing of a filter device. In this case, the filter element forms a cohesive structural unit that may be inserted into the filter housing or removed therefrom as a whole.

BRIEF DESCRIPTION OF THE DRAWINGS

Additional advantages and useful embodiments may be found in the other claims, the description of the figures, and the drawings.

Figure 1:
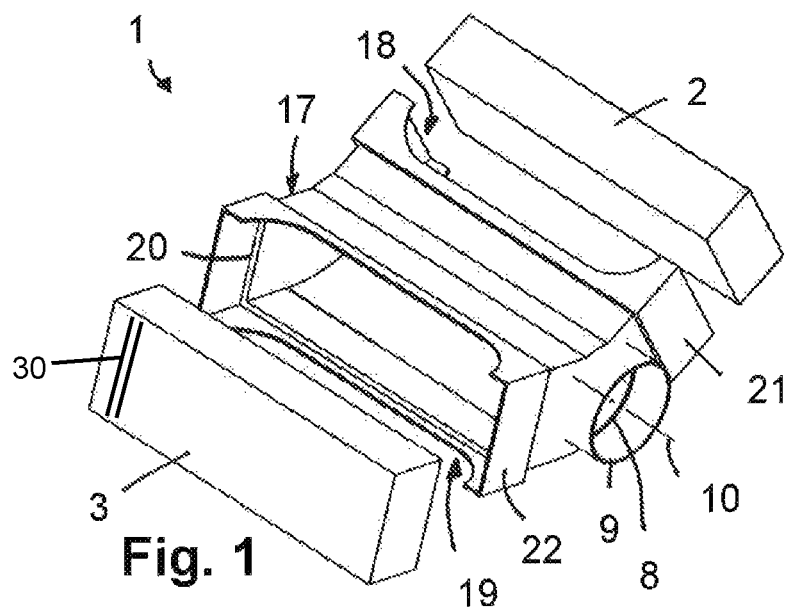
FIG. 1 is an exploded view of a filter element comprising a filter housing that has a support body for receiving two rectangular block-shaped, diametrically opposite filter medium bodies, each of which may be inserted in a receiving pocket on the filter housing, the receiving pockets and the filter medium bodies being oriented at an angle to one another and to the longitudinal axis of the filter element.

In the drawings, like components are assigned like reference signs.

DETAILED DESCRIPTION

Figure 2:
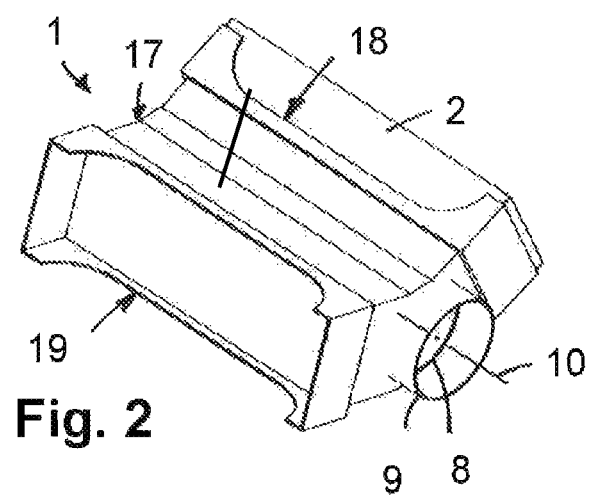
FIG. 2 depicts the assembled filter element according to FIG. 1.
Figure 3:
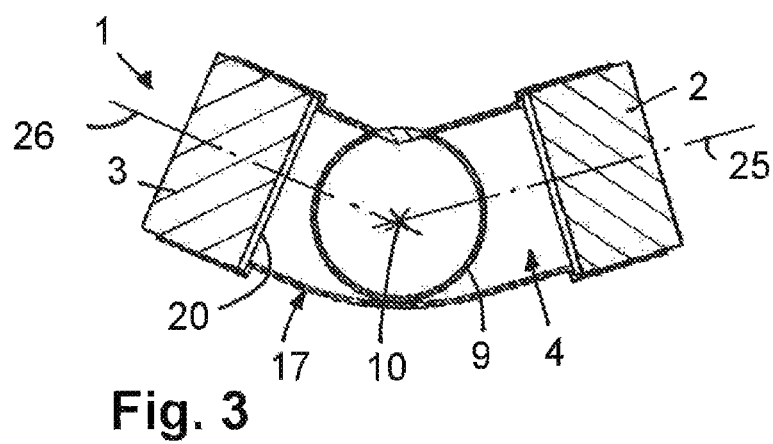
FIG. 3 depicts a section through the filter element according to FIGS. 1 and 2.

A first exemplary embodiment having a filter element 1 for a filter device for gas filtration is depicted in FIGS. 1 through 3. The filter element 1 forms a cohesive structural unit and comprises a first filter medium body 2 and a second filter medium body 3 on a filter element housing 17 that has a clean chamber 4 for the fluid filtered in the filter medium bodies 2, 3. The filter medium bodies 2, 3 are inserted in receiving pockets 18, 19 that are disposed at diametrically opposing sides of the filter element housing 17 and are embodied open to the outside. The interior contours of the receiving pockets 18, 19 are adapted to the exterior contours of the filter medium bodies 2, 3 to be received and have a circumferential wall 21 or 22 that is provided with a reduced height in the region of its longitudinal sides so that the fluid to be filtered can also flow in part through the circumferential sides of the received filter medium bodies 2, 3.

Disposed in the receiving pockets 18, 19 is a circumferential contact region 20 that is embodied, for instance, as an inwardly projecting circumferential projection and against which the inserted filter medium bodies 2, 3 are positioned. A sealing mass that forms a sealing edge for sealing and gluing the inserted filter medium bodies 2, 3 may be applied to the contact area.

Added to the filter element housing 17 that forms a support body for receiving and retaining the filter medium bodies 2, 3 is an outflow opening 8 to which a short outflow tube 9 is attached that is embodied integrally with the filter element housing 17. The axes of outflow opening 8 and outflow tube 9 are coaxial with the longitudinal axis 10 of the filter element housing 17. The inflow or unfiltered side and the outflow or filtered side of the two rectangular block-shaped filter medium bodies 2, 3 that are immediately adjacent to the clean chamber 4 are disposed parallel to the longitudinal axis 10 of the filter element 1.

In FIG. 3, center planes 25, 26 through the filter medium bodies 2, 3 are shown that are perpendicular to the inflow and outflow sides of the filter medium bodies 2, 3. The center plane sectional axis coincides with the longitudinal axis 10 of the filter element, which longitudinal axis runs parallel to the outflow side of at least one filter medium body. The center planes 25, 26 form an angle with one another that in the exemplary embodiment is approximately 30°. On the outside, the filter element housing 17 has a convex curved bend and is provided on the inside with an angle that equals the angle between the center planes 25 and 26. The outflow opening 8 and the outflow tube 9 are disposed on the side or end part of the filter element housing 17 between the two filter medium bodies 2, 3.

Figure 4:
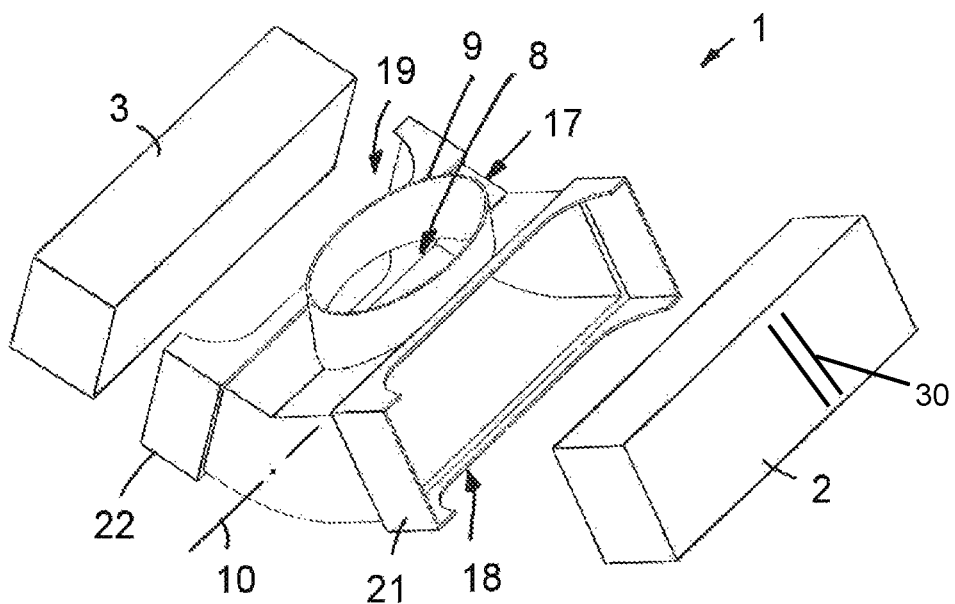
FIG. 4 depicts a variant of the filter element in which an outflow opening of a clean chamber is arranged in the filter element housing perpendicular to the longitudinal axis of the filter element.
Figure 5:
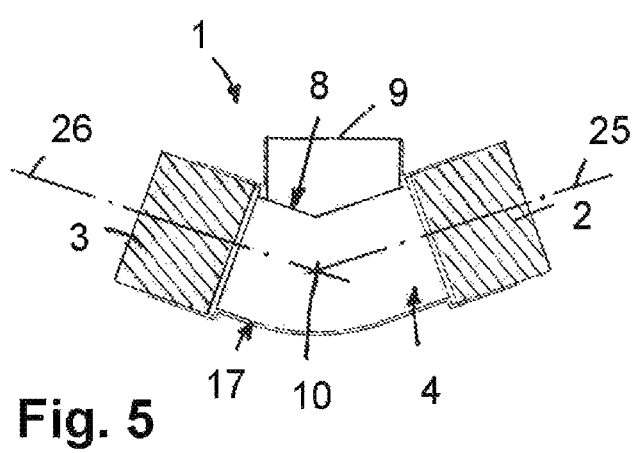
FIG. 5 is a section through the filter element according to FIG. 4.

FIGS. 4 and 5 depict another exemplary embodiment in which, similar to the first exemplary embodiment, the center planes of the two diametrically opposing filter medium bodies 2, 3 intersect in the longitudinal axis 10 of the filter element 1 and form an angle. In contrast to the first exemplary embodiment, however, the outflow opening 8 and the attached outflow tube are disposed on a wall section of the filter element housing 17 that extends parallel to the longitudinal axis 10 of the filter element 1; the axis of outflow opening 8 and outflow tube 9 runs perpendicular to the longitudinal axis 10 of the filter element.

The filter element housing 17 is embodied curved or bent, the outflow opening and the outflow tube 9 being disposed on the concavely curved inner side of the filter element housing 17.

Figure 6:
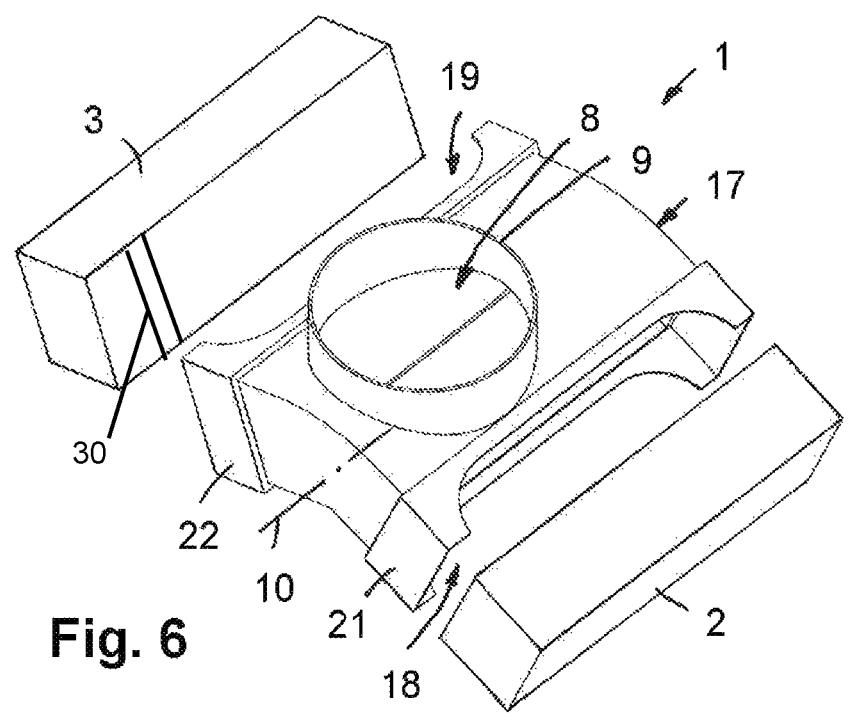
FIG. 6 depicts another variant of the filter element that, as in FIG. 4, has an outflow opening arranged perpendicular to the longitudinal axis of the filter element, the outflow opening being arranged on the convexly curved side of the filter element housing.
Figure 7:
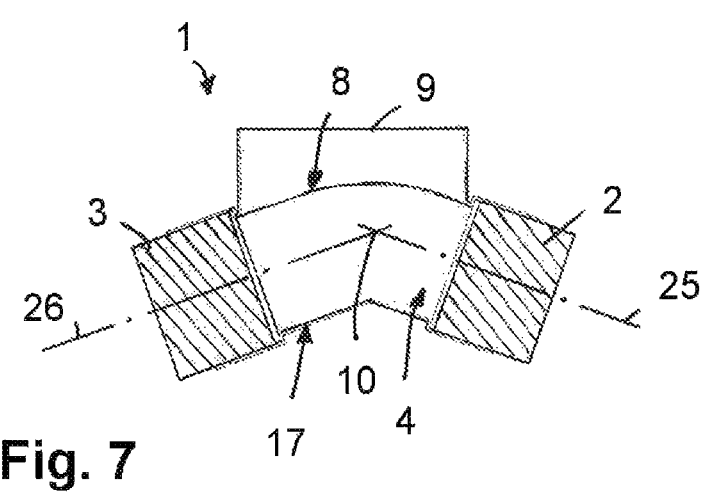
FIG. 7 is a section through the filter element according to FIG. 6.

FIGS. 6 and 7 depict another exemplary embodiment of a filter element 1 in which, just as in the example according to FIGS. 4 and 5, the outflow opening and the outflow tube 9 are arranged perpendicular to the longitudinal axis 10 of the filter element 1. In contrast to the previous exemplary embodiment, however, outflow opening 8 and outflow tube 9 are arranged on the convexly curved outer side of the filter element housing 17 in the area between the filter medium bodies 2 and 3.

Figure 8:
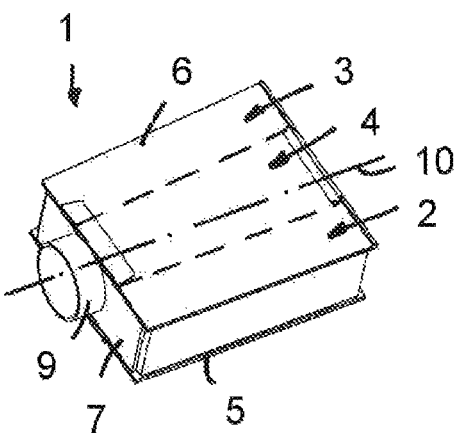
FIG. 8 depicts another variant of the filter element, in which the inflow and outflow sides of a filter medium body form an angle with the longitudinal axis of the filter element.

FIG. 8 depicts another exemplary embodiment of a filter element 1 in which the two filter medium bodies 2 and 3 that delimit the clean chamber 4 disposed therebetween are each embodied in a rectangular block shape, only the first filter medium body 2 running parallel to the longitudinal axis 10 of the filter element 1, however, while the second filter medium body 3 is at an angle to the longitudinal axis 10. The two filter medium bodies 2 and 3 are preferably constructed identically and have the same dimensions. Due to the oblique positioning of the second filter medium body 3 relative to the longitudinal axis 10, the result is a clean chamber 4 having a basic trapezoidal section that is enclosed by bottom 5, top 6, and sides 7 of the filter element housing. The center planes of the filter medium bodies 2 and 3 are disposed coplanar with one another, the longitudinal axis 10 of the filter element 1 is disposed in the center planes.

Figure 9:
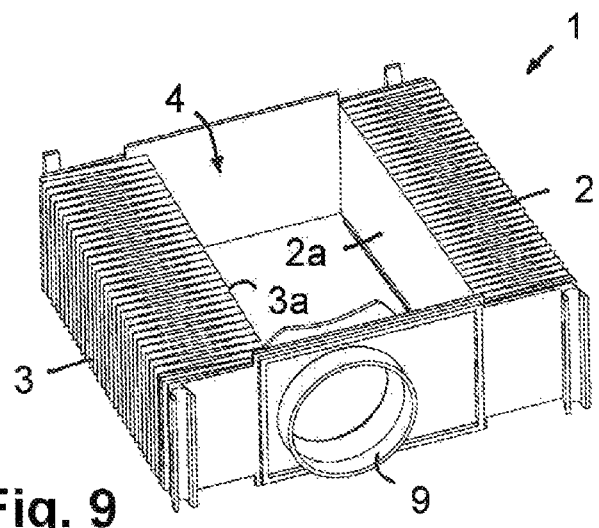
FIG. 9 is a perspective elevation of a filter element having two filter medium bodies embodied as pleated filters.
Figure 10:
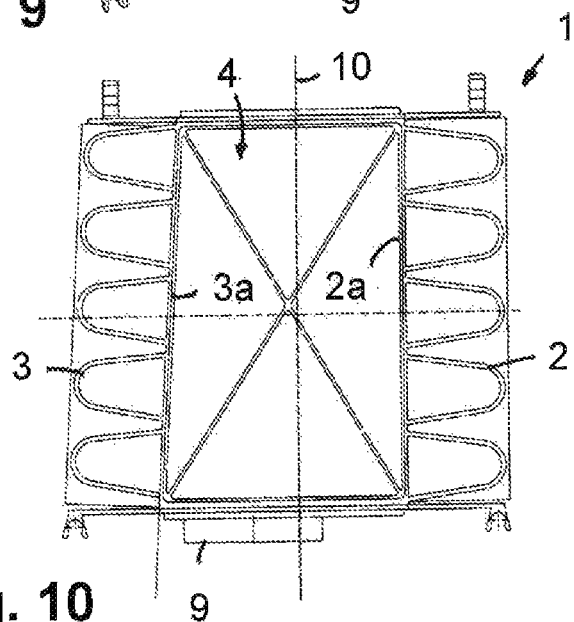
FIG. 10 is a top view of the filter element according to FIG. 9.

FIGS. 9 and 10 depict another exemplary embodiment having a filter element 1, both filter medium bodies 2 and 3 of which are embodied as pleated filters. The pleats extend between the exteriorly disposed inflow or unfiltered side of the filter medium bodies and the interiorly disposed outflow or clean sides 2a and 3a delimiting the clean chamber 4. The filter medium bodies 2 and 3 are each embodied in a rectangular block shape and may have the same dimensions.

The filter medium bodies 2 and 3 differ from one another with respect to their angular orientation relative to the longitudinal axis 10 of the filter element 1. The first filter medium body 2 is oriented parallel to the longitudinal axis 10 so that its outflow side 2a also runs parallel to the longitudinal axis 10. The outflow side 3a of the second filter medium body 3, on the other hand, with the longitudinal axis 10 forms an angle that in the exemplary embodiment is in a range greater than 5° and less than 10°. Due to the rectangular block-shaped embodiment of the filter medium body 3, the outer or inflow side, which runs parallel to the outflow side 3a, also forms an angle with the longitudinal axis 10. In contrast, in the first filter medium body 2, due to the parallel orientation, the inflow side is also parallel to the longitudinal axis 10. As in the prior exemplary embodiment, the center planes of the filter medium bodies 2 and 3 are coplanar with one another, the longitudinal axis 10 of the filter element 1 being disposed in the center planes.

The pleat backs 30 of the filter medium bodies 2, 3 embodied as pleated filters are shown in some of the figures.

What is claimed is:

1. A filter element for gas filtration comprising:
   a first filter medium body having an outflow side and an inflow side; and
   a second filter medium body having an outflow side and an inflow side;
   a common filter element housing in which both the first filter medium body and the second filter medium body are arranged, forming the filter element;
   wherein the common filter element housing delimits a common clean chamber from which a filtered fluid is to be conducted via at least one outflow opening;
   wherein the outflow sides and/or the inflow sides of the first and second filter medium bodies are disposed at a non-zero angle to one another;
   wherein the filter element has a longitudinal axis passing through the common filter element housing and extending parallel to a longitudinal extension direction of the first and/second filter medium body;
   a first center plane arranged parallel to a longitudinal axis of the common filter housing, the first center plate passing through a center of the outflow side of the first filter medium body and arranged perpendicular to the outflow side of the first filter medium body;
   a second center plane arranged parallel to the longitudinal axis of the common filter housing, the second center plate passing through a center of the outflow side of the second filter medium body and arranged perpendicular to the outflow side of the second filter medium body;

wherein the first center plane and the second center plane intersect along a line parallel to the longitudinal axis of the a filter housing;

wherein the first center plane intersects the second center plane at a non-zero angle relative to one another;

wherein the common filter element housing includes:
- a first receiving pocket formed onto the common filter element housing, the first filter medium body received into an interior of the first receiving pocket;
- a second receiving pocket formed onto the common filter element housing, the second filter medium body received into an interior of the second receiving pocket;
- wherein the receiving pockets each have a circumferential outer wall closing about lateral exterior sides of the filter medium body received therein;
- wherein the circumferential outer wall of the receiving pockets includes an inwardly projecting circumferentially closed projection, projecting radially inwardly from the circumferential outer wall into the interior of the receiving pockets;
- wherein the filter medium bodies contact against the inwardly projecting circumferentially closed projection in the receiving pockets, the inwardly projecting circumferentially closed projection forming a circumferential sealing edge against which the filter medium bodies are received and sealed.

2. The filter element according to claim 1, wherein the angle of intersection of the center planes is less than 180 degrees and greater than of 90 degrees.

3. The filter element according to claim 1, wherein the filter element has a housing center plane aligned with and lying on the longitudinal axis of the common filter housing, the housing center plane extending parallel to a longitudinal extension direction of the first and/or second filter medium body, and spaced midway between the first and second filter medium bodies, the housing center plane passing through the filter element housing and extending parallel to a longitudinal extension direction of the first and/or second filter medium body;

the outflow side and/or the inflow side of the first and/or second filter medium body is/are arranged at a non-zero angle relative to the housing center plane sectional axis of the filter element.

4. The filter element according to claim 3, wherein the angle of intersection of the first and second center planes is greater than 0 degrees and a maximum of 60 degrees.

5. The filter element according to claim 1, wherein at least one filter medium bodies is embodied in a rectangular block shape.

6. The filter element according to claim 3, wherein the outflow opening is concentric with an outflow opening axis;

the outflow opening axis is arranged at least approximately coaxial with or parallel offset to the longitudinal axis of the common filter element housing of the filter element.

7. The filter element according to claim 3, wherein the outflow opening is concentric with an outflow opening axis;

wherein the axis of the outflow opening is arranged at least approximately perpendicular to the longitudinal axis of the common filter element housing of the filter element.

8. The filter element according to claim 1, wherein the filter element housing is embodied curved and/or bent in a region of the clean chamber.

9. The filter element according to claim 1, wherein the filter medium bodies are embodied as pleated filters;

wherein at least one pleat pocket of the first filter medium body has an orientation that is different from at least one pleat pocket of the second filter medium body.

10. The filter element according to claim 1, wherein the filter medium bodies are embodied different in size and/or have different geometries.

11. The filter element according to claim 1, wherein the filter element housing is a one-piece unitary plastic injection molded part.

12. A filter device comprising:
a filter element according to claim 1;
a filter housing configured to receive the filter element.

* * * * *